United States Patent [19]

Jodlbauer

[11] Patent Number: 5,183,680

[45] Date of Patent: Feb. 2, 1993

[54] BAKING AGENT FOR LEAVENED DOUGH

[75] Inventor: Heinz D. Jodlbauer, Berlin, Fed. Rep. of Germany

[73] Assignee: A. Nattermann & Cie. GmbH Corporation of the Federal Republic of Germany, Koln, Fed. Rep. of Germany

[21] Appl. No.: 742,538

[22] Filed: Aug. 8, 1991

Related U.S. Application Data

[63] Continuation of Ser. No. 547,390, Jul. 3, 1990, abandoned, which is a continuation of Ser. No. 310,036, Feb. 10, 1989, abandoned, which is a continuation of Ser. No. 050,062, May 13, 1987, abandoned.

[30] Foreign Application Priority Data

May 16, 1986 [DE] Fed. Rep. of Germany ....... 3616597

[51] Int. Cl.$^5$ ............................................. A21D 2/32
[52] U.S. Cl. .................... 426/611; 426/662; 426/653; 426/64; 426/24; 426/20; 426/19
[58] Field of Search ....................... 426/64, 24, 20, 19, 426/611, 653, 662

[56] References Cited

U.S. PATENT DOCUMENTS

| | | | |
|---|---|---|---|
| 2,773,771 | 12/1956 | Julian et al. | 426/662 X |
| 3,060,030 | 10/1962 | Obenauf | 426/662 X |
| 4,443,378 | 4/1984 | Gunther | 260/403 |
| 4,452,743 | 6/1984 | Gunther | 260/403 |
| 4,482,474 | 11/1984 | Biedormanu et al. | 426/662 X |
| 4,608,267 | 8/1986 | Dutilh | 426/662 |
| 4,684,526 | 8/1987 | Knightly | 426/662 X |

FOREIGN PATENT DOCUMENTS

| | | |
|---|---|---|
| 719268 | 4/1942 | Fed. Rep. of Germany. |
| 1183452 | 12/1964 | Fed. Rep. of Germany. |
| 3047011 | 7/1982 | Fed. Rep. of Germany. |
| 3047012 | 7/1982 | Fed. Rep. of Germany. |

OTHER PUBLICATIONS

Andres, Lecithin-a multifunctional Ingredient, *Food Processing*, May 1983, pp. 113–115.

W. Shafer, "Grundatze der Verwendung von Lecithin in der Backerek", *Backerel Techn.* (1972, 73), pp. 69–77.

L. Von Wassermann, "Lipide als Backmittel", *Fette Seifen Anstrichmittel*, 1983, 85, 120; DE-PS 719 268, pp. 117–121.

J. Eichberg, Kirk-Othmer, "Laminated Wood-Based Composites to Mass Transfer", *Encyclopedia of Chemical Technology*, 3rd Ed., vol. 14, pp. 250–269.

J. Coppock et al., "Glycerides in Baking", *J. Sci. Food Agric.*, Jan. 5, 1954, pp. 19–26.

H. D. Jodlbauer, "Der Einsatz von Lipidstoffen (Emulgatoren) in der Brot-und Backwarenindustrie, unter besonderer Berucksichtigung des Begriffes 'Technologische Erfordernisse'", *Abhandlungen*, ZLR 1/77, pp. 33–45.

Y. Pomeranz, "Lecithin in Baking", Chapter Thirteen, U.S. Grain Marketing Research Laboratory, Agricultural Research Service, U.S. Department of Agriculture, Manhattan, Kansas, pp. 289–315.

Y. Pomeranz et al., "Wheat Germ in Breadmaking. II. Improving Breadmaking Properties by Physical and Chemical Methods", *Cereal Chem.* (1970) 47, 435 ff, pp. 429–437.

Y. Pomeranz, "Phosphatides in Baking Wheat Germ Bread", *Food Technology*, Aug. 1970, vol. 24, 927–928, pp. 91–92.

*Primary Examiner*—Joseph Golian
*Attorney, Agent, or Firm*—Kinney & Lange

[57] ABSTRACT

A baking agent and a process for producing a baking agent for leavened doughs includes a phospholipid fraction whereby the portion of phosphatidyl choline to phophtidyl ethanolamine is lower than 1.

6 Claims, No Drawings

BAKING AGENT FOR LEAVENED DOUGH

This is a continuation of application Ser. No. 07/547,390, filed on Jul. 3, 1990, now abandoned, which is a continuation of application Ser. No. 07/310,036, filed on Feb. 10, 1989, now abandoned, which is a continuation of application Ser. No. 07/050,062 filed May 13, 1987, now abandoned.

BACKGROUND OF THE INVENTION

1. Field of the Invention

The invention is related to a baking agent for leavened doughs and processes for producing such baking agents.

2. Description of the Prior Art

Yeast raised baked products as bread and cake products such are produced from flour, all or the majority of which is flour obtained from wheat. The quality of the baked products depends especially on the quality of the flour and particularly on the working of the dough. Only by intensely kneading the dough, the gluten in the flour gets the desired properties such as great extensibility, elasticity and gas holding ability.

The change from manually working the dough to working the dough by machine raises many problems in the production of dough. Only when lipids are added as emulsifiers, is knead tolerance increased.

The composition of lipids occuring naturally in wheat flour include a series of lipid components, which are also found in crude lecithin, for example lysophosphatidyl choline, phosphatidyl choline, N-acylphosphatidyl ethanolamines, phosphatidyl inositol, phosphatidyl acid, lysophosphatide acid, phosphatidyl glycerol, lysophosphatidyl ethanolamine, lysophosphatidyl glycerol, diglycerides, monoglycerides, triglycerides, stearins and the like. The lipids found in wheat flour play a part which is not insignificant. This part can be increased very clearly by addition of lechithin or synthetic emulsifiers. However, the addition of lechithin or synthetic emulsifiers poses problems due to the particular components in the lecithin or synthetic emulsifiers as well as the ratio of the particular phospholipids in the lechithin. (L. Wassermann, Fette Seifen Anstrichmittel 1983, 85, 20; Y. Pomeranz, Food Technol. 1970, 24, 928).

The role of lipids as emulsifiers in the form of the so-called crude lecithins, extracted from animal or vegetable materials, such as eggs, oliferous seeds and oilseeds, such as coconut-kopra, oil palm, peanuts, rape, sunflower kernel, sojabeans, oil palm and olives (J. Eichberg, Kirk-Othmer, Encyclopedia of Chemical Technology Vol. 14 Seite 250–269) in doughs and baking masses (H. D. Jodlbauer ZlR 1977 (1) 33–45; Y. Pomeranz, cereal Chem. 1970, 47, 435 ff; Y. Pomeranz, Food Technol. 1970, 24, 928 ff. I. B. M. Coppock, J. Sci. Food Agr. 1954, 5, 19 ff; DE-PS 1183 452; J. Pomeranz in B. F. Szuhaj and G. R. List 'Lecithins' AOCS 1985) has been investigated in detail.

As early as the 1940's, lecithin in amounts of from 0.1 to 0.5%, was employed in flour to bake bread. (L. Wassermann, Fette Seifen Anstrichmittel 1983, 85, 120; DE-PS 719 268; W. Schafer, Backerei Techn. 1972, 73). The consistency of dough when worked by machine was improved. The consistency of commercial lechithin is pastry to fluid. For better handling in baking, lecithin is attached to flour-like ingredients. However good baking results are not provided every time since the quality and composition of lecithin are uncertain depending on the origin of the lecithin being employed. Due to the uncertain quality and composition synthetic emulsifiers were used to a greater extent.

Only through the use of synthetic emulsifiers, alone or in mixture with lecithin, variations in the properties of bakery goods scarcely occured wherein the dough was worked by machine. Preferred emulsifiers were mono- and diglycerides of diacetyl tartaric acid or mono- and diglycerides of fruit acids such as citric acid and lactic acid, as well as other emulsifiers, for example polyglycerol esters, partially or completely esterified with fatty acids.

Using synthetic emulsifiers equally good properties are always obtained. However, quite recently an effort has been directed to put on the market foods which are free from synthetic components.

SUMMARY OF THE INVENTION

The present invention provides a baking agent for leavened doughs that includes emulsifiers obtained from a natural product which overcomes the drawbacks of the prior art lecithin emulsifiers, and which gives reproducably improved properties in the baking behavior and to the baked goods. The present invention further includes a process for producing such a baking agent.

The baking agent includes as the sole emulsifier a purified deoiled phospholipid fraction, wherein the proportion of phosphatidyl choline to phosphatidyl ethanolamine is lower than approximately 1.

DESCRIPTION OF THE PREFERRED EMBODIMENTS

The present invention includes a purified deoiled phospholipid fraction, wherein the proportion of phosphatidyl choline to phosphatidyl ethanolamine is lower than approximately 1. The phospholipid fraction of the present invention has the effect of an emulsifier. The fraction enables the formation of a fat/water emulsion so that the fat is better distributed and the receptivity of the dough for water is increased, which in turn gives an improved dough structure.

In contrast to the prior art emulsifiers, such as diacetyl tartrates, which activate the growth of yeast until the balance has been adjusted, the phospholipid fraction of the present invention varies the dough structure by changing the viscosity. In using the present invention, the dough achieves the same volume as with a synthetic emulsifier. The individual phospholipids in the phospholipid fraction of the present invention are more effective to flour components, such as proteins, starch and mucilages bringing many improvements of properties. Thus, the crumb of the finished dough becomes weaker, the volume becomes greater, the pores become finer and the pore walls become thinner. Also the fermentation of the dough is influenced so that an interruption of the fermentation is possible. The finished baked goods can be removed better from the pastry mold and the time of retention of freshness is longer.

Until now, it has not been clear that using a phospholipid fraction in which the portion of phosphatidyl choline to phosphatidyl ethanolamine is lower than approximately 1 a particular good improvement of properties is obtained.

Phospholipid fractions are preferred which contain 75 to 95% by weight phospholipids and 5 to 25% by weight sterols, sterol glycosides, sugar and/or mono-, di or triglycerides, whereby the portion of phosphatidyl choline to phosphatidyl ethanolamine is in the range of 1:2 to 1:10.

Preferred are phospholipid fractions which contain approximately 8 to 17% by weight phosphatidyl choline, 18 to 26% by weight phosphatidyl ethanolamine and as additional phospholipids lysophosphatidyl choline, lysophosphatidyl ethanolamine, lysophosphatidyl inositol, phosphatidyl inositol, phosphatide acid, lysophosphatide acid, phosphatidyl glycerol, lysophosphatidyl glycerol, N-acylphosphatidyl ethanolamine or lysophosphatidyl glycerol.

Particularly preferred are phospholipid fractions which contain approximately
8 to 17 weight % phosphatidyl choline
18 to 26 weight % phosphatidyl ethanolamine
10 to 18 weight % phosphatidyl inositol
9 to 15 weight % phosphatide acid
6 to 13 weight % N-acylphosphatidyl ethanolamine
2 to 12 weight % lysophospholipide
5 to 25% further phospholipides, sterols, sterolglycosides, sugar and triglycerides, whereby the triglyceride content is a maximum of approximately 5%.

The phospholipid fractions can be obtained in accordance to known processes as disclosed in DE-OS 30 47 012 and DE-OS 30 47 011 from soja beans, rape, sunflower kernel and other oliferous seeds and oilseeds; however, the preferred parent material is soja beans.

The phospholipid fractions are obtained preferably by extraction of crude lechithin (for example crude soja lecithin) with ethanol at a temperature of about 75° C. The components soluble in ethanol are separated from the insoluble components and after sedimentation at low temperature are subjected to column chromatography on silica gel according to EP 0054770.

The components from the column's permeate are combined with the components which are insoluble in ethanol. After distilling of the residual ethanol, the residue is deoiled in a known manner. By variation of the extraction- and column chromatography-conditions the ratio of phosphatidyl choline to phosphatidyl ethanolamine can be adjusted as desired, particularly to a range of approximately 1:2 to 1:10.

The amount of the phospholipid portion in the baking agent depends on the desired dough. In a very high grade fatty dough, a baking agent is required having a greater portion of the phospholipid fraction as in a lesser low grade fatty dough. In general, the phospholipid fraction is present in the baking agent in an amount in the range of 0.05 to 25%, an amount of 0.2 to 7.5% being preferred.

The baking agent according to the invention has a long shelf life. When produced with a fat which is free from lipase and lipoxidase and with at least 40% sugar, the baking agent has a shelf life of at least 1 year.

The baking agent may be produced in a known manner by mixing the phospholipid fraction with a molten fat component, adding flour, sugar and optional other powdery components and homogenizing the mixture by circulating in a pump installation and thereafter cooling the mixture down.

It has been found that by the manner of producing the baking agent, the effect of the phospholipid fraction of the present invention is further improved, if the phospholipid fraction is finely distributed in the fat or in the flour and the mixture is obtained in particularly small particles.

According to the invention, an optimum distribution of the phospholipid fraction in the fat component is achieved, if after the homogenization the fat component is obtained in crystallized form. According to the invention, optimum distribution of the phospholipid fraction in the flour is achieved, if the phospholipid fraction-flour-mixture is treated at such conditions that the phospholipids combine with the starch of the flour and a phospholipids-amylose-amylopectine-complex is formed.

In the case of the embodiment mentioned first, the fat component which may comprise animal and/or vegetable fats, is molten and the phospholipid fraction is stirred into the molten mass. The mixture is deep freeze atomized. A nozzle is preferably used to obtain a powder having a particle size in the range of 70 to 500 microns. Especially preferred is a fat-phospholipid fraction-powder mixture, 80% of which has a particle size of about 250 microns. Thereafter, the crystallized fat powder containing phospholipids is mixed with powdery components in such an amount that a 50% fat concentrate is obtained. This concentrate can be stored and may be mixed with the remaining components of the baking agent formulation immediately or upon using.

In the case of the second embodiment, flour between about 18% and about 22%, with a preferred moisture content of about 20% is passed together with enzymatic active malt flour and the phospholipid fraction through a screw extruder at a temperature of 140° C. At the conditions in the extruder the formation of the phospholipid-amylose-amylopectin-complex takes place. The product emerging from the extruder is post dried and then ground to a powder having a particle size in the range of about 500 microns. Then, this phospholipid-amylose-amylopectine-complex powder is mixed with the remaining components of the baking agent formulation.

To further illustrate the invention, the following examples are provided. The following examples are for illustrative purposes and are not intended to limit the present invention.

EXAMPLE 1

A baking agent with the phospholipid fraction of the present invention was produced in accordance to a known process.

A pastry baking agent was prepared having the following composition:

| | |
|---|---|
| flour type 550 | 2 kg |
| powdery sugar | 8 kg |
| fats | 6 kg |
| lactose | 2 kg |
| phospholipid fraction | 2 kg |

The phospholipid fraction had the following composition:

| | |
|---|---|
| phosphatidyl choline | 13.7 |
| phosphatidyl ethanolamine | 23.1 |
| lysolecithin | 2.9 |
| monophosphatidyl inositol | 16.8 |
| N-acyl-phosphatidyl ethanolamine | 5.4 |
| Phosphatidylacid | 15.0 |
| oil | 2 |
| the rest to 100% triglycerides, sugar and stearines | 28 |
| acid number | |

| | |
|---|---|
| peroxide number | 0.1 |

The phospholipid fraction was mixed with the molten fat and combined with the powdery components at a temperature of 50° C. and homogenized by circulating a pump installation and cooled down to 20° C. gradually.

A leavened dough was prepared having the following composition: 2000 g flour, type 550, 1000 ml water, 160 g yeast and 30 g salt. Into this dough 500 g of the baking agent described above was kneaded in a lifting kneader for 15 minutes. Further process conditions included: dough rest time 20 minutes, dough yield 150, dough charge 500 g, fermentation time of the dough pieces 80/90 minutes, dough temperature 26° C., oven temperature 200° C.

Baking results:

| | Baking agent according to the invention | according to prior art product 1* | product 2** |
|---|---|---|---|
| Bakery volume ml normal fermentation | 2290 | 2240 | 2300 |
| Bakery volume ml over fermentation | 2780 | 2570 | 2490 |
| Form | good curvature | similar | similar |
| Structure of pores | 5 | 5 | 5 |
| Crumb characteristic | a little coarse | a little coarse | a little coarse |
| Crumb elasticity | still elastic | still elastic | still stable |
| Taste | very good rounded | still rounded | still rounded |

*Product based on the emulsifiers mono- and diglycerides
**Product based on the emulsifier combination mono- and diglycerides blended with crude lecithin and diacetyl tartrate

EXAMPLE 2

A baking agent with the phospholipid fraction was produced in accordance to the process of the embodiment 1.

A powdery fat concentrate was produced and therewith a baking agent.

The fat concentrate included the following formulations:

| | |
|---|---|
| animal and vegetable fats partially hardened | 45% |
| sucrose | 34% |
| salt | 7% |
| malt flour | 3% |
| dextrin fractions | 5% |
| phospholipid fraction | 6% |

The fat component was heated to a temperature of 65° to 70° C. and the phospholipid fraction was mixed into a molten fat. The homogeneous mixture was atomized in a conventional deep freeze spray system. The fat powder obtained was mixed with the powdery components so that a 45% fat concentrate was obtained.

At a point in time later, a baking agent was produced with this fat concentrate in accordance to the formulation as follows:

| | |
|---|---|
| fat concentrate | 12% |
| sucrose | 4% |
| wheat flour, type 550 | 84% |

The same baking test was made as described in example 1 and similar results were obtained within the limit of error of baking tests.

EXAMPLE 3

A baking agent was produced with the phospholipid fraction in accordance to the process of embodiment 2.

A powdery baking agent was prepared over a lactose-amylose-amylopectin-complex powder. For this purpose were needed: wheaten flour, type 550 75% malt flour, enzymatic active 5% phospholipid fraction 20%

The characteristics of the wheaten flour are:

| | |
|---|---|
| protein content | 13.1% |
| ash content | 0.52% |
| water content | 14.2% |
| soluble carbohydrates | 3.4% |
| soluble protein | 3.45% |

1000 kg of this wheat flour was brought to a moisture of 20%. The phospholipid fraction was mixed into the flour and the mixture was extruded in a two-screw-extruder at a temperature of 145° C.

The product was forced out of the extruder through a nozzle of 7 mm, post dried and ground to a powder, 90% of which had a particle size between 150 and 250 microns. The phospholipid-amylose-complex powder was worked up to a baking agent of the following composition:

| | |
|---|---|
| phospholipid-amylose-complex powder | 15% |
| fat powder, crystallized (fat content 60%) | 65% |
| malt-flour, enzymatic active | 8% |
| acid whey powder | 7% |
| salt | 5% |

The production ensued in a conventional mixture.

The same baking test was made as described in example 1 and similar results are obtained within the limit of error of baking tests.

EXAMPLE 4

A baking agent was prepared with the phospholipid fraction according to the process of embodiment 1.

A powdery fat concentrate was prepared and therewith a baking agent as described in example 2. For the fat concentrate were needed:

| | |
|---|---|
| 49.5 kg | animal and vegetable fats, partially hardened |
| 37.4 kg | sucrose |
| 7.7 kg | salt |
| 8.8 kg | enzyme preparation on basis of amylases |
| 6.6 kg | phospholipid fraction |
| 110.0 kg | |

The above baking agent (110 kg) was mixed with flour, type 550 (890 kg) in a known manner to a finished flour.

With this finished flour different baked products were prepared.

a) Toast bread

A leavened dough was prepared having the following composition: 1000 g of the finished flour, 450 g water and 50 g yeast.

The working conditions were: knead time 15 minutes (laboratory kneader), dough rest time 10+10 minutes, dough yield 156, dough charge 580 g, fermentation time of the dough pieces 60 minutes, dough temperature 25° C., oven temperature 240° C., baking time 40 minutes.

Baking results:

| Fermentation vol. ml | 2150 |
| --- | --- |
| Normal fermentation | |
| Form | normal |
| Structure of pores | 6-7 |
| Crumb characteristic | fine |
| Crumb elasticity | elastic |
| Taste | very good rounded | b) Flaky pastries

The following ingredients were needed:

| For the dough: | 1000 g | of the finished flour |
| --- | --- | --- |
| | 450 g | water |
| | 50 g | yeast |
| | 600 g | fat for leavened dough or pastry |
| For the filling: | 300 g | persipan |
| | 150 g | fat |
| | 150 g | sugar |
| | 50 g | egg. |

At first the finished flour was mixed with the water and the yeast, then this mixture and the drawing fat were worked up to a "pastry" dough (3 simple turns). The "pastry" dough was rolled out to 50 cm ×90 cm and was cut to 6 strips of 50 cm ×15 cm.

The ingredients for the bakery filling were stirred and spread on the middle of the dough strips. The dough edges were spread with water, the dough was folded over, the edge was cut in and placed on the baking plate to flaky pastries. The baking temperature was 210° C., the baking time 30 minutes. After the baking, the pastries were apricoted and glazed.

Baking results:

6 great pastries were obtained having a light yellow bright surface. The taste was rounded, true to type. The structure was fine.

c) Chelsea bun strips

The following ingredients were needed:

| For the dough: | 1000 g | of the finished flour |
| --- | --- | --- |
| | 450 g | water |
| | 60 g | yeast |
| For the filling: | 300 g | persipan |
| | 150 g | sugar |
| | 150 g | fat |
| | 100 g | egg. |

The finished flour was intensively kneaded with the water and the yeast to a dough and rolled out to 2 dough pieces of about 50 cm ×30 cm (750 g).

The ingredients o the bakery filling were stirred and spread on the two dough pieces. These dough pieces were rolled out and the dough rope was deeply cut in a vertical direction in distances of about 2 cm. The chelsea buns, in this manner cut off to ¾, were laterally spaced apart to left and to right, spread with egg and baked at ¾ fermentation.

The baking temperature was 210° C., the baking time 25 minutes.

After baking, the two chelsea bun strips were apricoted and glazed.

Baking results:

The chelsea bun strips had a rounded taste, true to type. The structure was fine, the bite was short and soft.

Although the present invention has been described with reference to preferred embodiments, workers skilled in the art will recognize that changes may be made in form and detail without departing from the spirit and scope of the invention.

What is claimed is:

1. A baking agent for leavened dough including a phospholipid fraction comprising phosphatidyl choline, phosphatidyl ethanolamine and phosphatidyl inositol, and a fat component, the baking agent comprising:

wherein the phospholipid fraction contains 8% to 17% by weight phosphatidyl choline and 18% to 26% by weight phosphatidyl ethanolamine;

wherein the phospholipid fraction further includes lysophosphatidyl choline, lysophosphatidyl ethanolamine, lysophosphatidyl inositol, phosphatide acid, lysophosphatide acid, phosphatidyl glycerol, lysophosphatidyl glycerol, N-acylphosphatidyl ethanolamine an lyso-N-acylphosphatidyl ethanolamine; and wherein the phospholipid fraction further includes sterols, sterol glycosides, sugar and/or monoglycerides, diglycerides or triglycerides.

2. The baking agent of claim 1 wherein the phospholipid fraction includes:

10%–18% by weight phosphatidyl inositol,

9%–15% by weight phosphatide acid,

6%–13% by weight N-acylophosphatidyl ethanolamine,

2%–12% by weight lysophospholipid, and

5%–25% by weight other phospholipids, sterols, sterol glycosides, sugar, triglycerides.

3. The baking agent of claim 1 wherein the phospholipid fraction includes less than 5% by weight triglycerides.

4. The baking agent of claim 1 wherein the phospholipid fraction is in an amount of from 0.05% to 25% by weight o the baking agent.

5. The baking agent of claim 4 wherein the phospholipid fraction is in an amount of from 0.2% to 7.5% by weight of the baking agent.

6. The baking agent of claim 1 wherein the phospholipid fraction contains 75% to 95% by weight phospholipids and 5% to 25% by weight sterols, sterol glycosides, sugar and/or monoglycerides, diglycerides or triglycerides.

* * * * *

UNITED STATES PATENT AND TRADEMARK OFFICE
CERTIFICATE OF CORRECTION

PATENT NO. : 5,183,680
DATED : February 2, 1993
INVENTOR(S) : Heinz D. Jodlbauer It is certified that error appears in the above-indentified patent and that said Letters Patent is hereby corrected as shown below:

On the title page, Item [73]: "Kampffmeyer Muhlen GmbH, Hamburg, Vereinigte Kunstmuhlen AG, Ergolding, A. Nattermann & Cie. GmbH, Koln, all in Fed. Rep. of Germany" should read --Kampffmeyer Muhlen GmbH, Vereinigte Kunstmuhlen AG, A. Nattermann & Cie. GmbH, all in Fed. Rep. of Germany--.

Col. 8, line 33, delete "an", insert "and"

Col. 8, line 52, delete "o", insert "of"

Signed and Sealed this

Twenty-fifth Day of January, 1994

Attest:

BRUCE LEHMAN

*Attesting Officer*    *Commissioner of Patents and Trademarks*